(No Model.)
M. F. HENDERSON.
MEANS FOR ATTACHING SADDLES TO BICYCLES.
No. 580,785. Patented Apr. 13, 1897.
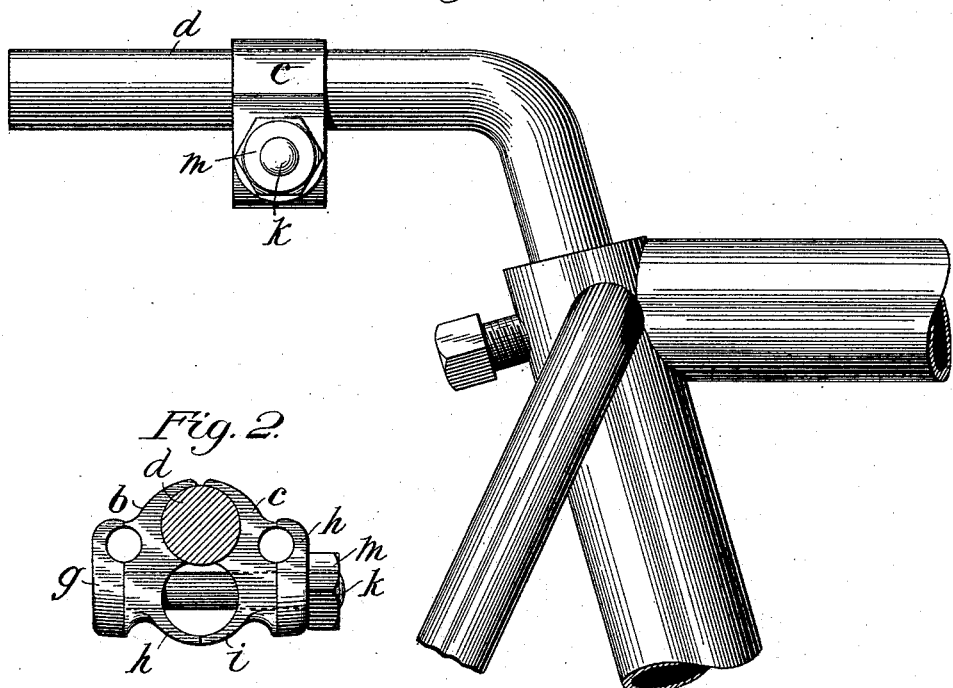
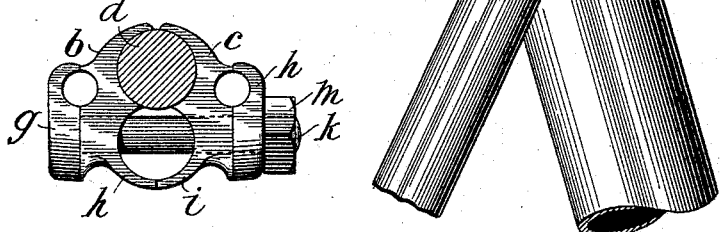
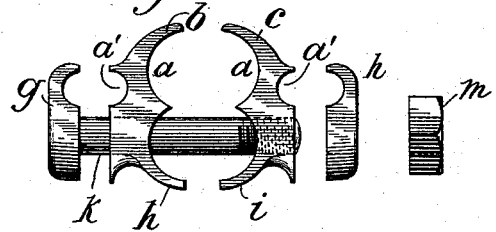
Witnesses.
Anthony Pollok.
Philip Mauro
Inventor.
Mary Foote Henderson

United States Patent Office.

MARY FOOTE HENDERSON, OF WASHINGTON, DISTRICT OF COLUMBIA.

MEANS FOR ATTACHING SADDLES TO BICYCLES.

SPECIFICATION forming part of Letters Patent No. 580,785, dated April 13, 1897.

Application filed January 19, 1897. Serial No. 619,776. (No model.)

*To all whom it may concern:*

Be it known that I, MARY FOOTE HENDERSON, of Washington, District of Columbia, have invented certain new and useful Improvements in Means for Attaching Saddles to Bicycles, which improvements are fully set forth in the following specification.

The object of the present invention is to provide a clamp for attaching a bicycle-saddle to a bicycle-frame, which may adapt itself to bicycle-frame parts of different sizes, and which will permit the adjustment of the saddle as desired.

The invention consists of a bolt having at one end a lug provided with a concave depression. On this bolt are strung three other lugs, so shaped and designed as to form a central socket for the saddle-post of the bicycle, and on each side of the central socket a smaller socket for the two wires constituting part of frame of the saddle. The other end of the bolt is screw-threaded, and the parts are all clamped together by a nut engaging this threaded end. The two intermediate lugs have on their adjacent faces a semicircular recess, thus forming an approximately circular socket for the saddle-post, and on the other face a recess which, with the corresponding recess on the adjacent lug, constitutes the socket for one of the wires of the saddle. These sockets may be circular, square, or of other form in section, according to the shape of the parts to be clamped.

The invention will be better understood by reference to the accompanying drawings, in which—

Figure 1 is a side view of the clamp as fastened to the saddle-post. Fig. 2 is a side elevation of the clamp, and Fig. 3 is a similar view of the clamp with its sections separated.

The intermediate lugs $b$ and $c$, Fig. 3, are formed substantially as represented, each with a curved recess at $a\ a$ in the adjacent faces of the lugs, forming a socket to grasp and hold the saddle-post $d$. On the opposite face of each lug is a smaller recess $a'$, which with the corresponding recess in the adjacent lug $g$ or $h$ forms a socket grasping one of the saddle-wires. The braces for the lugs $b\ c$ are shown at $h\ i$. The bolt $k$, passing through all the sections of the clamp, may be round, rectangular, or other shape. The lug $g$ is rigidly attached to the bolt and the other sections are clamped against it by a nut $m$, engaging the threaded end of the bolt.

Having thus described my invention, what I desire to secure by Letters Patent is—

A clamp or device for attaching a bicycle-saddle to a bicycle-frame, said clamp comprising in combination a rod or bolt, a lug rigidly attached to said rod at one end, the other end being screw-threaded, three lugs loosely strung on said rod and having in their adjacent faces recesses forming sockets for the saddle-post, and for the wires of the saddle respectively, the intermediate lugs having meeting projections forming braces on the opposite side of the bolt to the socket, and a nut for clamping all the lugs together, substantially as described.

In testimony whereof I have signed this specification in the presence of two subscribing witnesses.

MARY FOOTE HENDERSON.

Witnesses:
ANTHONY POLLOK,
REEVE LEWIS.